Figure 4:
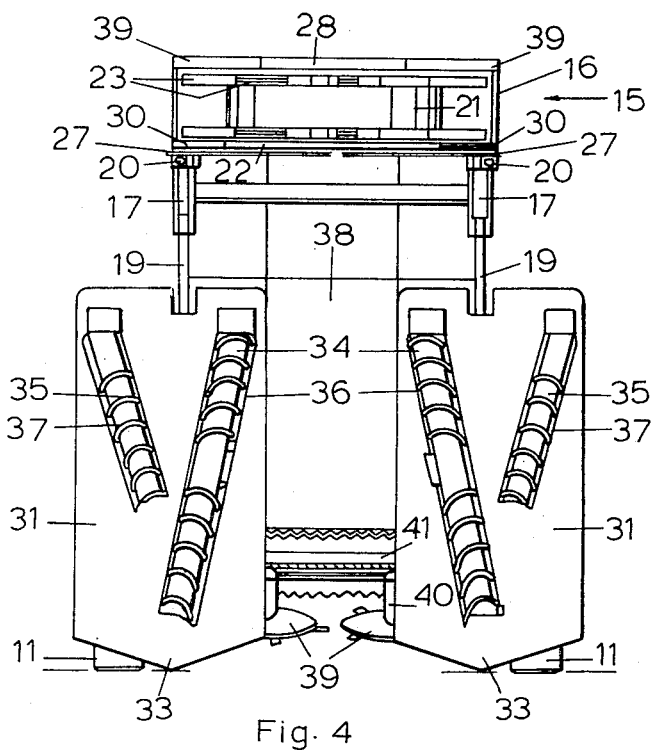

US United States Patent [19] [11] 3,673,774
Mizzi [45] July 4, 1972

[54] CANE HARVESTER

[72] Inventor: Joseph Michael Mizzi, Halifax Road, Ingham, Australia

[22] Filed: Nov. 23, 1971

[21] Appl. No.: 201,359

[52] U.S. Cl. ............................56/13.9, 56/13.3, 56/14.3, 56/14.5, 56/16.5, 56/16.6, 56/60, 56/63
[51] Int. Cl. ...........................................................A01d 45/10
[58] Field of Search .....................56/12.8, 13.3, 13.6–13.9, 56/14.3, 14.5, 16.5, 16.6, 60, 61, 63, 95, 119, 255, 295, 503, 504, 505; 146/117–121 A; 209/78, 106, 107

[56] References Cited

UNITED STATES PATENTS

| 2,618,385 | 11/1952 | Silver et al. | 209/107 |
| 2,723,669 | 11/1955 | Pool et al. | 146/120 X |
| 2,792,113 | 5/1957 | Minera | 209/107 |
| 2,885,853 | 5/1959 | Jarvis | 146/117 R |
| 3,028,957 | 4/1962 | Conway et al. | 209/106 |
| 3,283,895 | 11/1966 | Rollins | 209/107 |
| 3,398,515 | 8/1968 | Ash | 56/63 |
| 3,434,271 | 3/1969 | Gaunt et al. | 56/13.8 X |
| 3,451,084 | 6/1969 | Silver | 209/107 X |
| 3,519,129 | 7/1970 | Peterson | 209/106 X |
| 3,599,404 | 8/1971 | Fernandez et al. | 56/12.8 |

Primary Examiner—Louis G. Mancene
Assistant Examiner—J. A. Oliff
Attorney—Donald D. Jeffery

[57] ABSTRACT

A sugar cane harvester has cutters for removing cane tops and cutting the stalks which are conveyed to a chopper having a bladed and a slotted rotor interacting to cut the stalks into billets and deliver them to a cane cleaner of toothed parallel rotating drums which tear leaf from the billets and discharge them to an elevator, on which they are carried over parallel screws, alternate screws being oppositely wound and oppositely rotated, for pulling leafy matter from the billets before the billets are discharged from the elevator.

6 Claims, 9 Drawing Figures

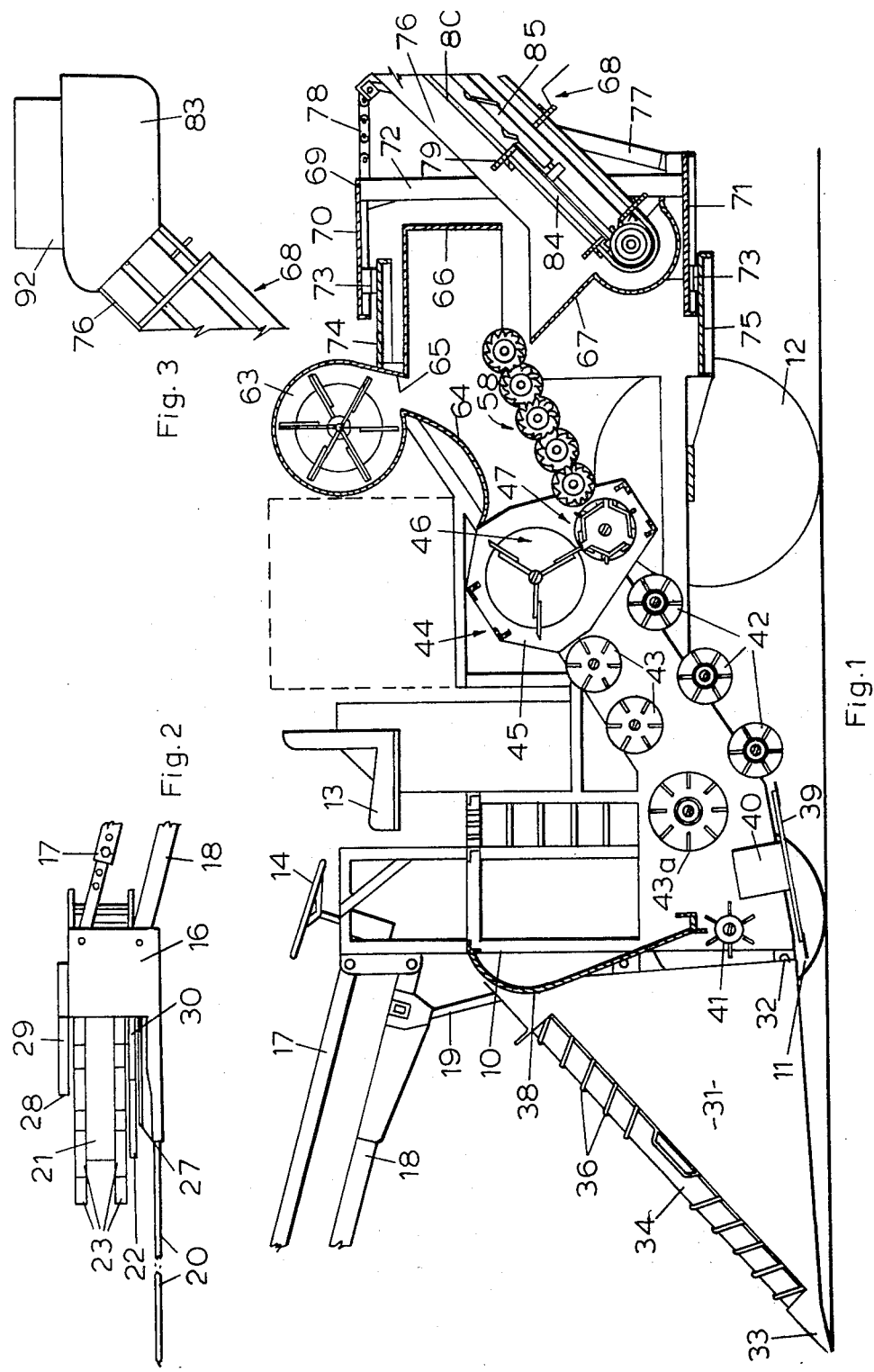

3,673,774

CANE HARVESTER

This invention relates to an improved sugar cane harvester.

The general object of the invention is to provide a sugar cane harvester which, although simple and economical to manufacture, is particularly efficient in harvesting sugar cane which is topped, cut and chopped into billets, and effectively cleaned of leafy matter, before being discharged to be received in a bin or other suitable receptacle drawn behind and to one side of the harvester.

Broadly, the invention resides in a sugar cane harvester including a wheel-mounted power-driven main frame; a pair of crop lifter arms extending forwardly from both sides of the front of the main frame and adapted as the harvester is advanced to pass to either side of a row of cane to be harvested; a topping cutter mounted on and extending forwardly from the main frame and adapted as the harvester advances to sever tops from the cane; base cutter means on the main frame adapted to cut the cane at or near to ground level; a conveyor on the main frame adapted to convey the cut cane rearwardly, butt-ends first, through the harvester from the base cutter means to a chopping cutter on the main frame; the chopping cutter being adapted to cut the cane stalks into billets and discharge the billets to a cane cleaner assembly on the main frame; the cane cleaning assembly being adapted to pull leafy matter from the billets and to convey the billets to an elevator mounted at the rear of the main frame; the elevator being adapted to elevate the billets and discharge them from the harvester. Other features of the invention will become apparent from the following description.

Figure 5:
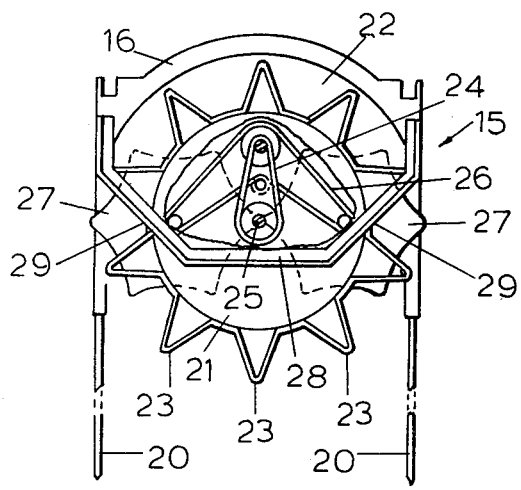
Figure 6:
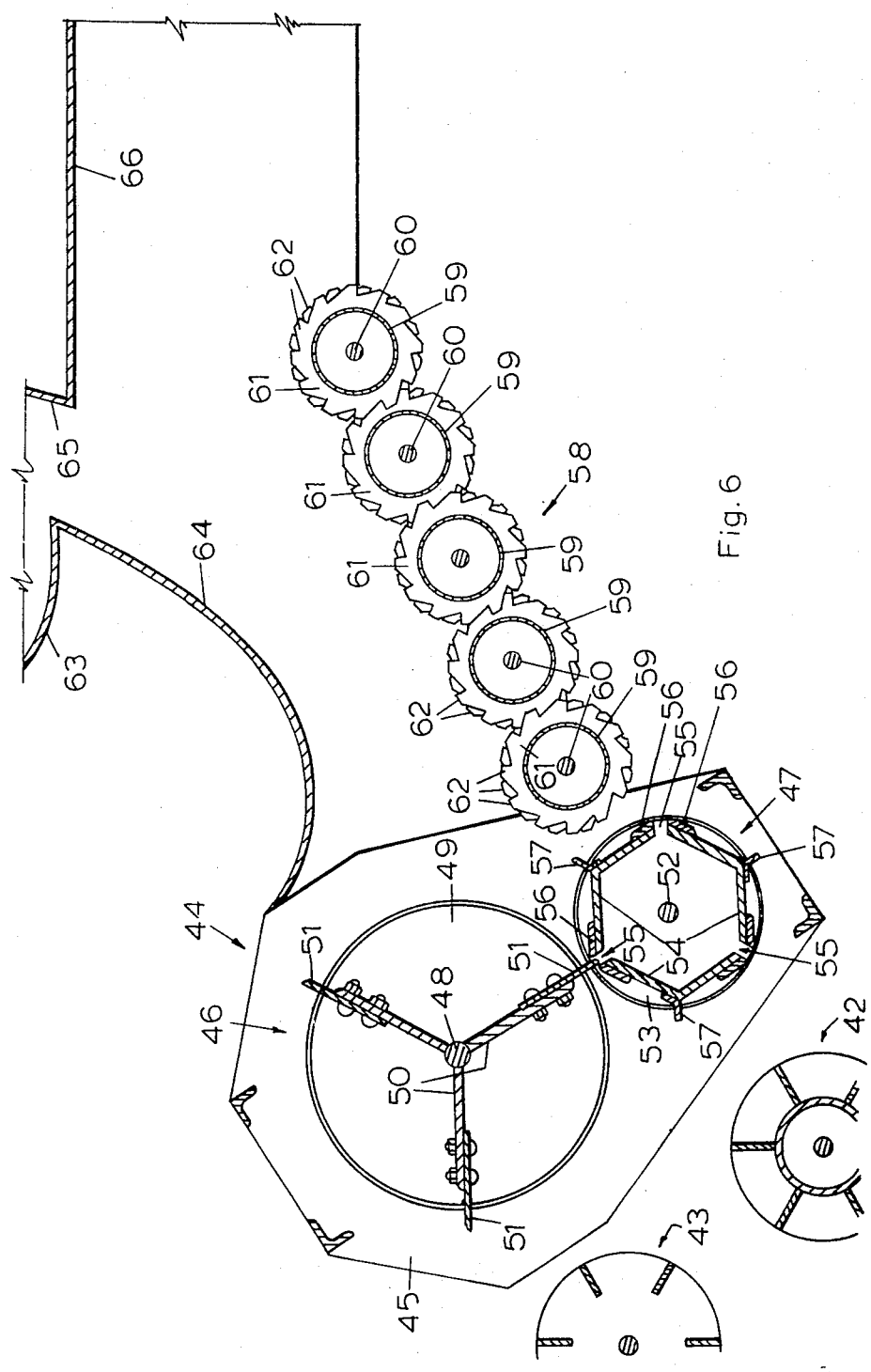
Figure 7:
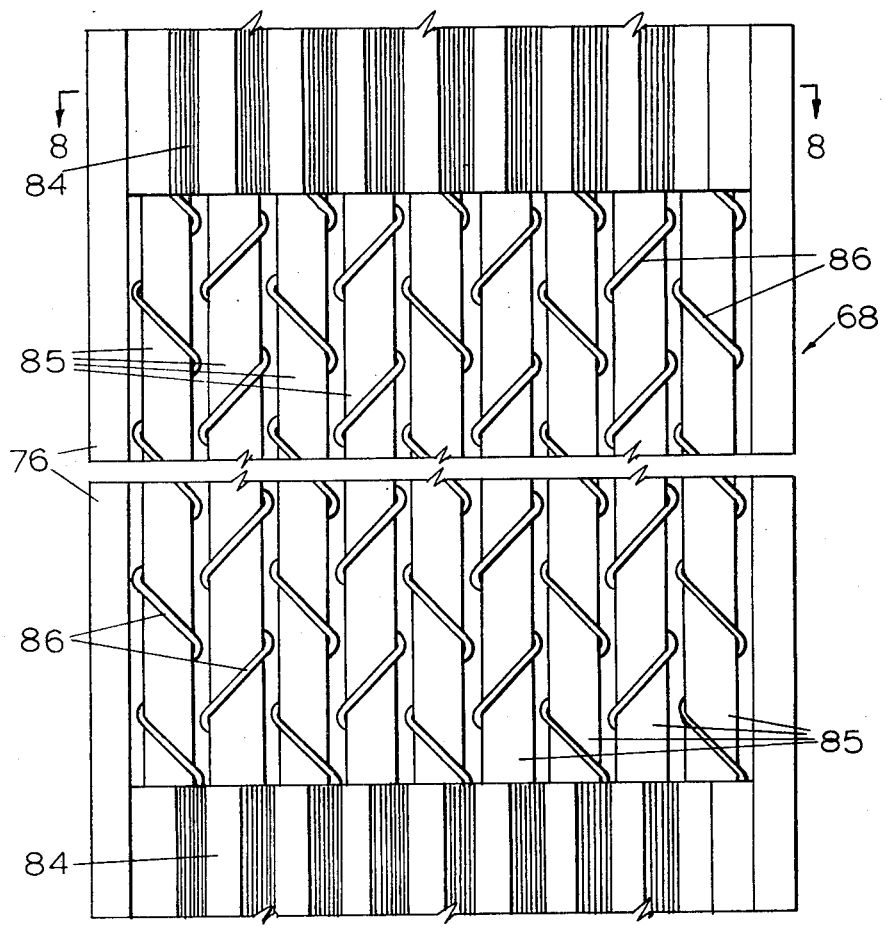
Figure 8:
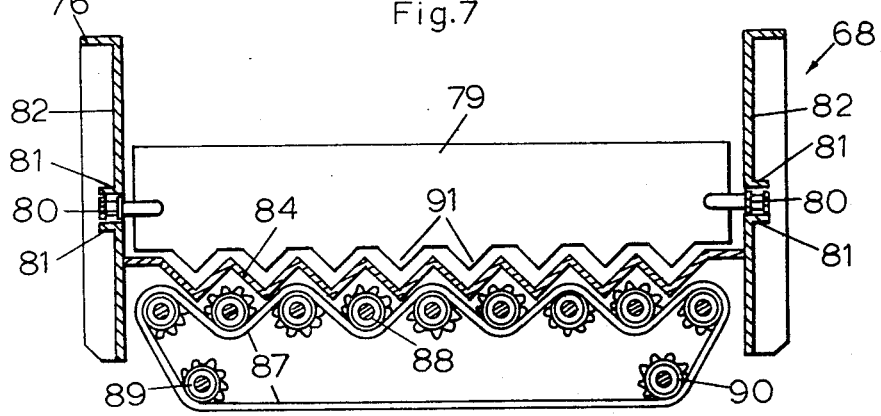
Figure 9:
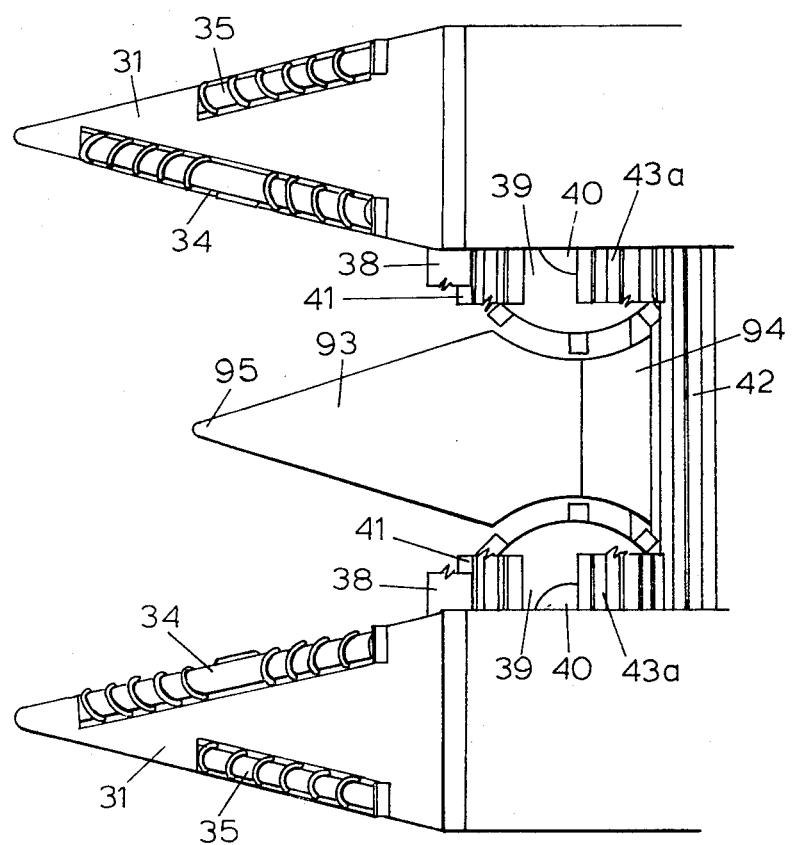

A preferred embodiment of the invention is shown in the accompanying drawings, wherein:

FIG. 1 is a longitudinal sectional view of a sugar cane harvester according to the invention, the topping cutter assembly and the upper part of the elevator being omitted, FIG. 2 is a side elevation of the topping cutter assembly of the harvester, FIG. 3 is a side elevation of the head of the elevator, FIG. 4 is a front elevational view of the harvester, FIG. 5 is a plan view of the topping cutter assembly, FIG. 6 is a longitudinal sectional view, to enlarged scale, of the assembly for chopping and cleaning the harvested cane, FIG. 7 is a fragmentary plan view, to enlarged scale, of part of the cleaning elevator of the harvester, FIG. 8 is a sectional view along line 8—8 in FIG. 7, and FIG. 9 is a plan view of the front part of a modified form of harvester, for two-row harvesting.

Referring initially to FIGS. 1 to 8, the harvester includes a main frame 10 mounted on a pair of steerable front wheels 11 and a pair of rear drive wheels 12. A driver's seat 13 is mounted fairly high near to the front of the harvester convenient to a steering wheel 14 and other controls (not shown) for the various operations of the harvester.

As the harvester is driven along a row of sugar cane to be harvested, the leafy tops of the cane are first severed by a topping cutter assembly indicated generally at 15, and including a topper frame 16 pivoted about transverse axes, one above the other, to the front ends of upper and lower lifting frames 17 and 18 which at their rear are pivoted about transverse axes to the upper front of the main frame 10, the parts being arranged so the topping cutter may be raised or lowered in parallelism by a pair of hydraulic rams 19 connected between the front of the main frame and the lower lifting frame 18. Cane tops received between a pair of lead-in arms 20 extending forwardly from the frame 16 are guided to a rotating drum 21, its axis substantially vertical, mounted above a bottom plate 22 of the frame 16, and having fingers 23 extending outwardly from its upper and lower parts. The drum may be driven selectively in one direction or the other by a hydraulic motor (not shown) mounted above the bottom plate 22 and within the drum, and connected by a chain drive 24 to the shaft 25 of the drum, and by a further chain drive 26 to the parallel shafts of a pair of rotary scalloped cutters 27 close under the bottom plate 22 and to either side of the axis of the drum, both of the cutters being rotated in the same direction as the drum. A top guide bar 28 mounted on the frame 16 and extending across the drum has oblique side portions 29 which are rearwardly divergent, and directly below these the bottom plate 22 has similarly inclined oblique sections 30. The cane tops engaged by the drum fingers 23 are carried to one or other of the cutters 27, are severed thereby, and are guided by the appropriate oblique parts 29 and 30 of the top guide bar and bottom plate to be thrown to one side of the harvester, the hydraulic motor being operated so as to cause the tops to be thrown to the side already cleared of cane.

Two spaced crop-lifter arms 31 extend forwardly from the sides of the front of the main frame 10, to which their lower rear parts are hinged about a common transverse axis at 32. The upright sides of each crop-lifter arm are forwardly convergent to, and its top surface is inclined forwardly and downwardly to, a point at 33 which tends to penetrate the soil and be driven under fallen cane. Each of these arms has a rotary crop-lifter 34 at its upper and inner edge portion, and a rotary crop separator 35 at its upper and outer edge portion, both of these rotary members being driven by hydraulic motors (not shown). The rotary crop lifter is a cylinder having secured about it a helical thread 36 which is wound in one direction at the front, at its middle part is carried longitudinally for a short distance, and at its rear is wound in opposite direction to the front part. The crop separator, shorter and commencing further back than the rotary crop lifter, has a helical thread 37 secured about it, the rearmost part of this thread being carried longitudinally.

The two rotary crop lifters 34 are rotated in opposite directions so that the front parts of their threads 36 tend to move cane stalks engaged thereby upwardly relative to the harvester, the rear parts of their threads tending to move the engaged stalks forwardly. The crop separators are so rotated as to urge cane stalks engaged thereby rearwardly relative to the cane harvester. Thus the crop separators tend to pull cane stalks, in a row next to the row being harvested away from the cane of the harvested row.

Topped cane stalks received between the crop lifter arms 31 after being straightened by the rotary crop lifters 34 are pushed forwardly by the upper parts of the threads of the rotary crop lifters, and also by a pusher plate 38 on the front of the main frame 10; and these stalks are cut at or near to ground level by a pair of counter-rotating rotary base cutters 39 mounted below the front of the main frame, each being a disc with radiating blades, and with a co-axial feed drum 40 secured thereabove.

The butt ends of the severed stalks are urged rearwardly by a vaned transverse rotary feeder 41 below the bottom of the pusher plate 38, and by the counter-rotating base cutters 39 and feed drums 40, and the stalks are carried, butt ends first, through a conveyor system comprising a series of transverse vaned lower rollers 42, and a series of transverse vaned upper rollers 43, all of which are driven. Of the upper rollers 43, the leading one 43a is of larger diameter than the following ones, and constitutes a beater, for ensuring that the butts of stalks leaving the base cutters are guided down onto the lower rollers 42, and preferably is vertically movable and spring-loaded downwards. The remaining upper rollers 43 may also be vertically movable within limits and spring-loaded downwards.

The said conveyor system feeds the stalks upwardly and rearwardly to a chopper assembly indicated generally at 44. This assembly has a pair of parallel side plates 45 between which are upper and lower rotors 46 and 47. The upper rotor has a driven transverse shaft 48 on which are secured end discs 49, between which three equally spaced blade carrier vanes 50 radiating from the shaft are secured. To each of these blade carriers a chopper blade 51 is secured in radially adjustable manner. The lower rotor has a transverse driven shaft 52 on which are secured end discs 53 between which there are secured three angle members 54 to form an arrangement substantially hexagonal in cross-section, the three angle members being spaced apart to form three transverse slots 55, at alternate angles of the hexagonal arrangement. Wearing strips 56 are secured to both sides of each of these slots. From the other angles of the hexagonal arrangement, feeder vanes 57 extend radially outwards.

The feeder vanes 57, and also the vanes of the lower rollers 42 and upper rollers 43, and of the rotary feeder 41, are preferably serrated, for better engagement with the cane being carried through the harvester.

The diameter of the lower rotor 47 is similar to that of the lower rollers 42, and all are driven in the same direction and at the same speed. The diameter of the upper rotor 46 is double that of the lower rotor, and the upper rotor is counter-rotated at such speed that the peripheral speeds of the two are similar, and the chopper blades of the upper rotor 46 enter the slots 55 of the lower rotor 47, chopping the cane stalks into billets which are thrown rearwardly by the counter-rotating rotors.

The billets of cane are cleaned by a cleaning assembly indicated generally at 58, and consisting of a number of parallel elongated cylindrical drums 59, on shafts 60 which are driven in the same direction and at the same speed, each of the drums 59 having secured thereabout a series of equally spaced rings 61 of the outer part of each of which is shaped to form a series of equally spaced ratchet-like teeth 62. The teeth 62 of succeeding rings 61 of each drum 59 are in staggered arrangement, as may be seen particularly in FIG. 6, and moreover the rings 61 of succeeding drums 59 are in staggered arrangement so that a ring of one drum is aligned mid-way between two succeeding rings of the next; and the drums are so located that the teeth of each drum fairly closely approach the periphery of the next drum. The arrangements of cleaning drums inclines upwardly towards the rear, and billets ejected from the chopper having leafy matter stripped from them by the teeth of the rotating drum.

The cane billets, while passing over the cleaning drums 59, are acted on by a strong flow of air from a rotary blower 63, this air being directed downwardly and forwardly by a curved plate 64 and an oblique plate 65 extending from the exhaust of the blower. The fairly dense billets are thrown through this air flow, but the light leafy pieces are directed thereby onto the teeth 62 of the cleaning drums, and are carried by the teeth down through the drum assembly to be discharged to the ground.

The passage of the billets, thrown by the chopper assembly and by the rotating cleaning drums is interrupted by a hood 66, and caused to drop therefrom into a receptacle 67 at the lower end of a cleaning elevator indicated generally at 68.

The elevator 68 is mounted on an oscillating frame 69, having top and bottom plates 70 and 71 rigidly interconnected by a pair of uprights 72, the top and bottom plates being connected by co-axial upper and lower pivots 73 to top and bottom brackets 74 and 75 extending rearwardly from the main frame 10. The elevator has a casing 76 the lower end of which is pivoted about a transverse axis to the oscillating frame 69, and which may be pivotally raised or lowered by a pair of hydraulic rams 77 connected between the oscillating frame and the casing, chains 78 connected between the frame 69 and the casing 76 limiting the downward pivotal movement of the elevator. By any suitable mechanism (not shown) the oscillating frame 69 may be moved about the pivots 73 to swing the elevator to one side or the other.

The elevator has a series of transverse cleats 79 carried by a pair of endless chains 80 the upper parts of the loops of these chains travelling between flanges 81 on the sides 82 of the casing 76, the cleats being adapted to move cane billets fed into the receptacle 66 up through the casing to a head 83 at the upper end of the casing, from which the billets are discharged.

The cleats, in moving the billets upwardly through the casing, carry them over longitudinally corrugated lower and upper casing bottom sections 84 which connect the lower and the upper parts of the casing sides 82. Between these lower and upper sections 84 the billets are carried over a series of cleaning rollers 85, each being an elongated round-section tubular member with a helical flight 86 secured thereabout, the flights of succeeding cleaning rollers being wound in opposite directions. The cleaning rollers are driven, so that succeeding rollers are rotated in opposite directions, by an endless chain 87 engaged with, and passed alternately over and under, sprockets 88 mounted on the cleaning rollers at one end of the assembly, the chain being engaged also with an idler sprocket 89 and a drive sprocket 90 on the shaft of a hydraulic motor (not shown). The bottom part of each of the elevator cleats 79 is formed with downwardly extending teeth 91 so that the cleat fits fairly closely to the corrugated sections 84, and to the assembly of cleaning rollers 85.

The flight 86 of each of the rotating cleaning rollers 85 tends to grip, between itself and a succeeding roller, pieces of leafy matter on the cane billets, and to pull such matter from the billets and to discharge it to the ground.

The head 83 of the elevator is an open-bottomed housing, having at its top an extractor fan (not shown) within a casing 92, and adapted to draw a strong flow of air up through the billets being discharged into and from the head, so as to separate from the billets any particles of leafy matter adhering thereto or delivered separately into the head.

The harvester above described is for the purpose of harvesting cane from one row at a time. However, it may be modified for harvesting two rows simultaneously by being made sufficiently wide to straddle two succeeding rows, and by its front part being modified as shown in FIG. 9 of the drawings. In this modification, the crop lifter arms 31, fitted, as before described, with rotary crop lifters 34 and rotary crop separators 35, are adapted to pass to either side of a pair of adjacent rows of cane when the harvester advances. The base cutters 39, instead of closely approaching each other, closely approach the rear side portions of a divider member 93, and the front side portions of a ramp plate 94 to which the divider member 93 is hinged at its rear about a transverse axis. The divider member tapers forwardly to a point 95, any suitable means being provided for limiting its hinged downward movement, so that the point will pass under and assist in lifting fallen cane, the divider inclining downwardly to each side from its longitudinal center line. The cane of both rows is cut by the rotary cutters 39, and is urged rearwardly, over the rearwardly and upwardly inclined ramp plate 94, by the rotary base cutters 39 and their feed drums 40, and by the rotary beater 43a and thence, as before described, to the chopping, cleaning and elevating assemblies of the harvester.

Sugar cane harvesters according to the invention will be found to be very effective in achieving the objects for which they have been devised. It will, of course, be understood that the particular embodiment of the invention herein described and illustrated may be subject to many modifications of constructional detail and design without departing from the ambit of the invention.

What I claim is:

1. A sugar cane harvester including a wheel-mounted power-driven main frame; a pair of crop lifter arms extending forwardly from both sides of the front of the main frame for passing to either side of a row of cane to be harvested; a topping cutter mounted on and extending forwardly from the main frame for severing tops from the cane; base cutter means on the main frame for cutting the cane adjacent to ground level; a conveyor on the main frame for conveying the cut cane rearwardly, butt-ends first, through the harvester from the base cutter means to a chopping cutter on the main frame; the chopping cutter cutting the cane stalks into billets and discharging the billets to a cane cleaner assembly comprising a series of parallel transversely extending cleaning drums on the main frame, said drum receiving thereon billets from the chopping cutter, a plurality of circumferentially extending series of teeth extending from each of the drums, means for rotating the drums in the same direction to urge billets received thereonto to the rear and a blower above the drums for directing air down onto the drums; the teeth tearing leafy matter from the cane billets received thereon and conveying such leafy matter under the drums and there discharging it, and impelling the billets to an elevator mounted at the rear of the main frame for elevating and discharging the billets.

2. A sugar cane harvester according to claim 1 wherein the chopping cutter includes an upper rotor and a lower rotor, the axes of each of said rotors extending transversely to the main frame; means for counter-rotating the two rotors; a plurality of transversely extending blades extending substantially radially from the upper rotor, a series of transversely extending slots in the lower rotor, said motor being counter-rotated, the blades of the upper rotor entering the slots of the lower rotor to chop into billets cane fed between the rotors by the conveyor; and transverse feeder vanes extending from the lower rotor for impelling the billets rearwardly in the harvester.

3. A sugar cane harvester according to claim 1 wherein the elevator includes a casing inclining upwardly from the main frame and having sides and a bottom; a series of endless-chain-mounted transverse cleats, and means for driving the chains to move the cleats upwards over the said bottom; the bottom including a cleaning section comprising a series of adjacent longitudinally extending cleaning rollers each having a helical flight about a shaft, the flights of succeeding rollers being oppositely wound, and means for rotating the adjacent rollers in opposite directions, the flights of the rollers catching leafy matter on cane billets conveyed by the cleats and drawing it between the rollers to be discharged from below the casing bottom.

4. A sugar cane harvester according to claim 1 wherein the topping cutter includes a topper frame supported in front of the main frame by lifting members whereby the topper frame may be raised or lowered; a conveyor drum, mounted on the topper frame, the axis of said conveyor drum being substantially vertical; means for rotating the drum about its axis; a pair of rotary cutters on the topper frame below the drum, one to each side thereof; means for driving the cutters; and feeder means on the drum for engaging cane tops as the harvester advances and for carrying them to one of the rotary cutters.

5. A sugar cane harvester according to claim 1 wherein a pair of rotary crop lifters are mounted, in rearwardly and upwardly inclined and convergent arrangement, on the crop lifter arms, each of said crop lifter being a cylindrical shaft with a helical flight secured thereabout, the lower and front part of which is wound in opposite direction to the upper and rear part; and means for counter-rotating the rotary crop lifters about their axes; the flights engaging and lifting cane stalks with the front parts of their flights, and with the rear parts of their flights urging the engaged cane stalks forwardly relative to the harvester; and a pair of rotary crop separators are mounted, in rearwardly and upwardly inclined and divergent arrangement, on the outer parts of the crop lifter arms, each of said crop separators being a cylindrical shaft with a helical flight secured thereabout; and means for counter-rotating the rotary crop separators about their axes; the flights of the crop separators engaging cane stalks of a row of cane to either side of the cane being harvested and urging them upwardly and rearwardly relative to the harvester.

6. A sugar cane harvester according to claim 1 wherein the harvester is adapted to harvest simultaneously two succeeding rows of cane, the crop lifter arms passing to opposite sides of the two rows; and there is connected to the main frame and extending forwardly from the front bottom part thereof a divider, forwardly tapering in plan view, for passing between and separating cane of the two rows.

* * * * *